July 13, 1965   I. C. FREDRIKS   3,193,998
PICK-UP UNIT FOR NUT HARVESTING
Filed July 29, 1963   3 Sheets-Sheet 1

INVENTOR.
Ilo C. Fredriks
Webster & Webster
ATTYS.

July 13, 1965    I. C. FREDRIKS    3,193,998
PICK-UP UNIT FOR NUT HARVESTING
Filed July 29, 1963    3 Sheets-Sheet 3
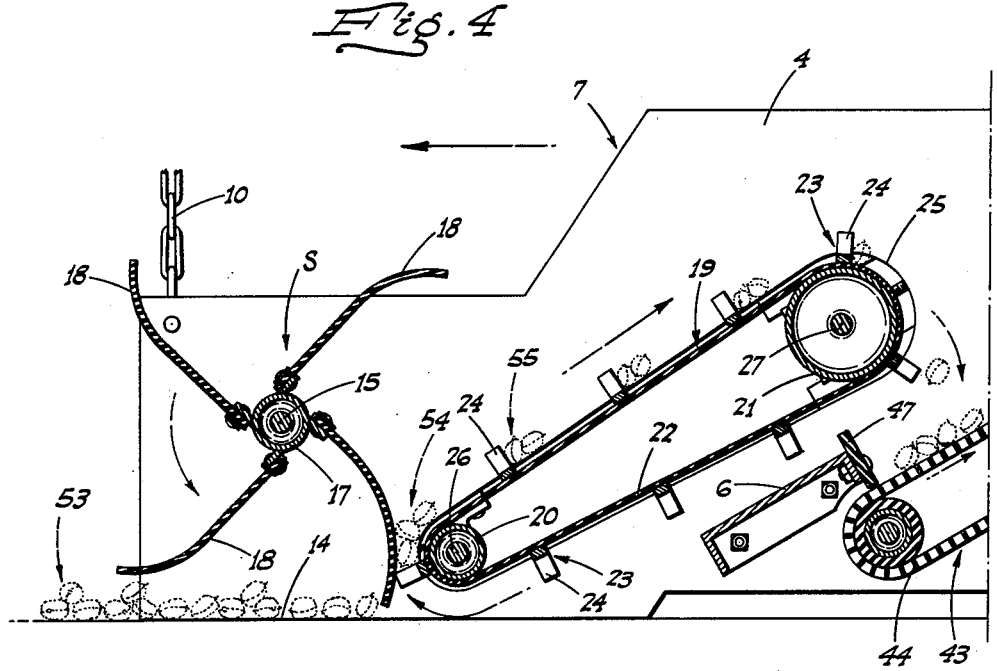
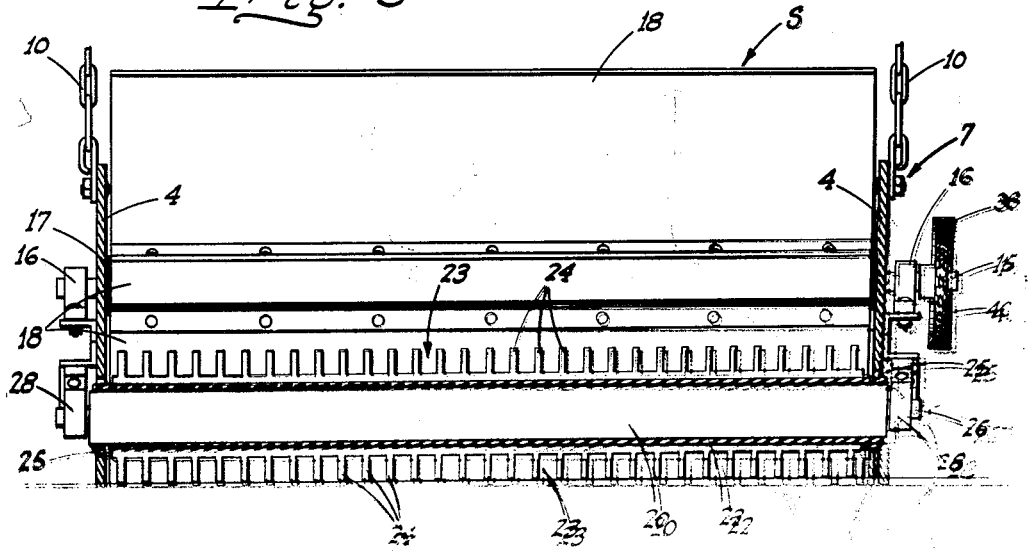

United States Patent Office 3,193,998
Patented July 13, 1965

3,193,998
PICK-UP UNIT FOR NUT HARVESTING
Ilo C. Fredriks, Rte. 1, Box 302, Ripon, Calif.
Filed July 29, 1963, Ser. No. 298,082
6 Claims. (Cl. 56—328)

This invention relates to agricultural implements, and particularly to a device for picking up nuts which have fallen or been knocked onto the ground at harvesting time, and have then been raked up or otherwise gathered together in the form of windrows.

The major object of the present invention is to provide a pick-up unit, adapted to be attached to and pulled by a tractor, which will straddle a windrow of nuts, pick up the windrowed nuts, remove all foreign matter therefrom, and finally deliver the picked up nuts, in a clean condition, into a wagon or similar receptacle connected in trailing relation to the pick-up unit.

Another important object of the invention is to provide a unit, for the purpose described, in which the pick-up features are so constructed and arranged that an extremely gentle and yet efficient pick-up action is provided whereby, while the unit has been particularly developed for use in connection with the harvesting of nuts of different kinds, it is also admirably adapted for picking up certain fruits without damaging the same.

The pick-up unit involves certain parts which must be driven to be operative, and an additional object of the invention is to provide means for driving such parts, in coordinated relation, from the usual power take-off shaft of the tractor.

A further object of the invention is to provide a pick-up unit for nut harvesting which is designed for ease and economy of manufacture.

A still further object of the invention is to provide a practical, reliable, and durable pick-up unit for nut harvesting, and one which is exceedingly effective for the purpose for which it is designed.

These objects are accomplished by means of such structure and relative arrangement of parts as will fully appear by a perusal of the following specification and claims.

In the drawings:

FIG. 4 is an enlarged fragmentary sectional elevation of the unit.

FIG. 5 is an enlarged cross section of the unit, taken on line 5—5 of FIG. 1.

Figure 1:
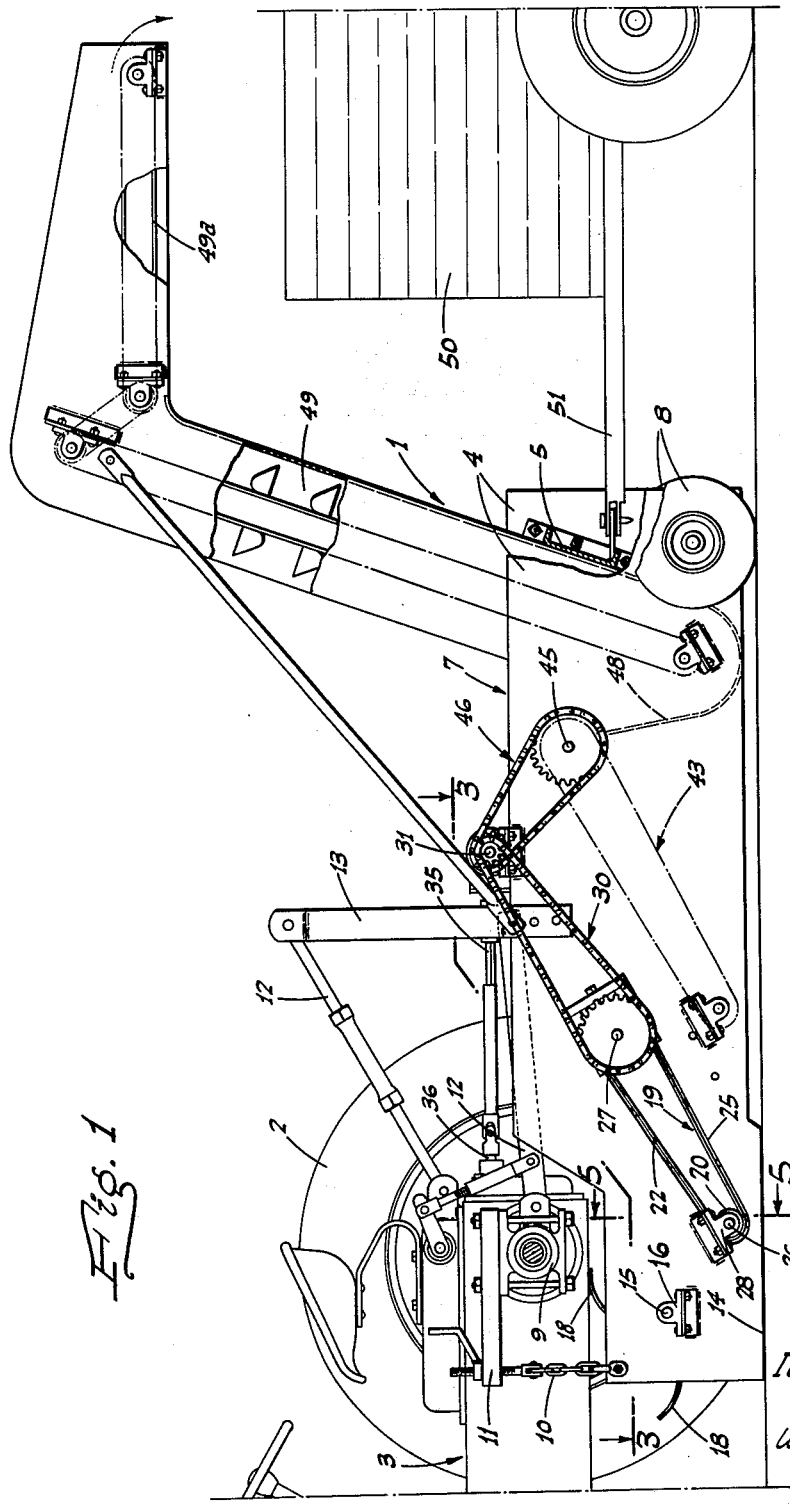
FIG. 1 is a side elevation of the improved pick-up unit partly broken out and in section, and shown as attached to a tractor and delivering into a trailing wagon.

Referring now more particularly to the drawings and to the characters of reference marked thereon, the pick-up unit, indicated generally at 1, is constructed and adapted at its forward end to fit between the rear wheels 2 of a conventional farm type tractor 3 and to be connected in draft relation thereto. To this end, the unit 1 comprises a pair of transversely spaced nut-confining side plates 4 connected together adjacent their rear ends by a cross beam 5 and intermediate their ends by another cross beam 6 (see FIG. 4). These plates and cross beams together form the rigid chassis or body 7 of the unit, which body is supported at its rear end from the ground by wheels 8.

At its forward end, the body 7 projects under the rear axle housing 9 of the tractor as shown in FIG. 1, and is supported from the tractor by means of hanger chains 10 attached to the side plates 4 at their forward ends. Each chain depends from and is vertically adjustable in a bracket 11 clamped onto and projecting forwardly from the adjacent portion of the axle housing 9.

The body 7 is connected in draft relation to the tractor 3 by means of the conventional draft and lifting arms 12 found on tractors of this type, and which at their rear ends are connected in vertically spaced relation to rigid standards 13 secured on and upstanding from the side plates 4. The lower edges of the plates 4 along the forward portions thereof only are arranged to just clear the ground as shown at 14; the extent of clearance being determined by the adjustment of the chains 10.

The essential pick-up features of the unit are disposed between the plates 4 in the area of the edge portion 14 of said plates, and are constructed and arranged as follows:

Disposed between the plates 4 is a rotary sweep indicated generally at S. This sweep comprises a transverse shaft 15 extending between the plates 4 near their forward end and intermediate the top and bottom edges thereof; said shaft being journaled at its ends in bearings 16 secured on said plates 4 on the outside thereof. A drum 17 is secured on the shaft 15 for the full distance between the plates 4, and a plurality of vanes 18 are secured on and project from the drum for the full length thereof and in tangential relation thereto as shown in FIG. 4. The vanes are made of a suitable flexible and resilient material, such as rubber, of a grade or type which will readily yield upon contact with a rigid object, but will regain its original form when clear of such object. The vanes 18 are of a greater radial extent than the distance of the shaft 15 from the ground, and are formed with their radially outer portion curving in a direction contra to the direction of rotation of the shaft, which at the bottom is in a rearward direction as indicated.

The vanes 18, when the unit is in operation, deliver onto the forward end of an endless conveyor indicated generally at 19 and which slopes upwardly and rearwardly from its forward end at an acute angle to the horizontal. This conveyor comprises front and rear end rollers 20 and 21, respectively, over which an endless belt 22 is trained. Cross cleats 23, preferably in the form of toothed combs in which the teeth 24 are relatively widely spaced as shown in FIG. 5, are secured on and project at intervals from the belt 22.

The lower forward conveyor roller 20 is disposed so that the cleats 23 as they pass about said roller slightly enter the ground and then project into the path of the various vanes 18. The rollers 20 and 21, as well as the belt 22 extend through openings 25 in the plates 4, so that the side edges of the belt are outwardly of said plates, as shown in FIG. 5. The axial shafts 26 and 27 of the rollers 20 and 21 are journaled in bearings 28 and 29, respectively, disposed outwardly of the plates 4.

The conveyor 19 is driven so that the upper run of the belt 22 moves rearwardly by means of an endless chain drive 30 extending between one end of the upper shaft 27 of said conveyor and the corresponding end of a driven countershaft 31 parallel to shaft 27 and disposed rearwardly thereof on top of the plates 4. Shaft 31 projects from a gear box 32 which is mounted on a bracket 33 extending from a cross bar 34 preferably provided as a unit with the standards 13 at the base thereof (see FIG. 3). A drive shaft 35 for the shaft 31 projects into the gear box 32 from the usual power take-off shaft 36 of the tractor, as indicated in FIG. 1.

Figure 2:
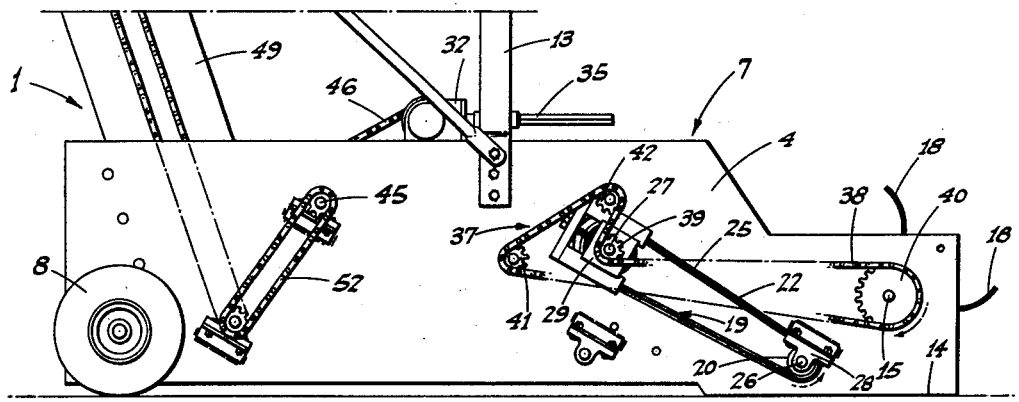
FIG. 2 is a fragmentary side elevation of the pick-up unit detached from the tractor and wagon, and taken from the side opposite that shown in FIG. 1.

As shown in FIG. 2, the shaft 15 is driven from shaft 27 in the opposite direction, and on the side of the body 7 opposite the chain drive 30, by means of another chain drive 37. This drive comprises an endless chain 38 which passes under and in engagement with a sprocket 39 on shaft 27, then over and about a sprocket 40 on shaft 15. From the underside of sprocket 40, the chain 38 extends to and passes about a pair of spaced idler sprockets 41 and 42 mounted on the adjacent side plate 4, and thence runs back to the sprocket 39; the sprocket 42 being disposed relative to the drive sprocket 39 so that the chain 38 has ample wrap-around engagement with said drive sprocket to provide an efficient drive.

This drive arrangement is such that the sweep S is driven substantially at ground speed or slightly faster, and the drive connection between the sweep and conveyor 19 disposes the cleats 23 and vanes 18 in such coordinated relation to each other that each cleat and one vane will contact each other in V-shaped pocket forming relation as they both move upwardly, as shown in FIG. 4.

The conveyor 19 at its upper rear end discharges onto the forward end portion of another upwardly and rearwardly sloping conveyor 43 which includes an endless belt 44 of a conventional open or "cleaner" type of construction. The shaft 45 of the upper belt engaging roller of conveyor 43 is driven from the shaft 31 by an endless drive chain unit 46. A rubber stop strip 47 extends upwardly from adjacent the upper run of the belt 44 at its lower end; said strip being secured to the cross beam 6 of the body 7, as shown in FIG. 4.

The conveyor 43 at its upper rear end discharges into a hopper 48 extending between and supported by the body plates 4 adjacent their rear end, as indicated in FIG. 1. The lower end of an upwardly extending elevator 49, of the conventional scoop or bucket type as indicated, projects into the hopper 48 to elevate any produce which may be fed into the same by the conveyor 43. The elevator 49 is fixed in connection with the body 7 in a suitable manner, and includes at its upper end a rearwardly projecting horizontal conveying extension 49a adapted to discharge into a trailing wagon 50 which is detachably connected in draft relation to the body 7 at its rear end by a tongue 51. The elevator 49 is driven at its lower end from the shaft 45, and on the side of the unit opposite the chain drive 46, by a chain drive unit 52.

Figure 3:
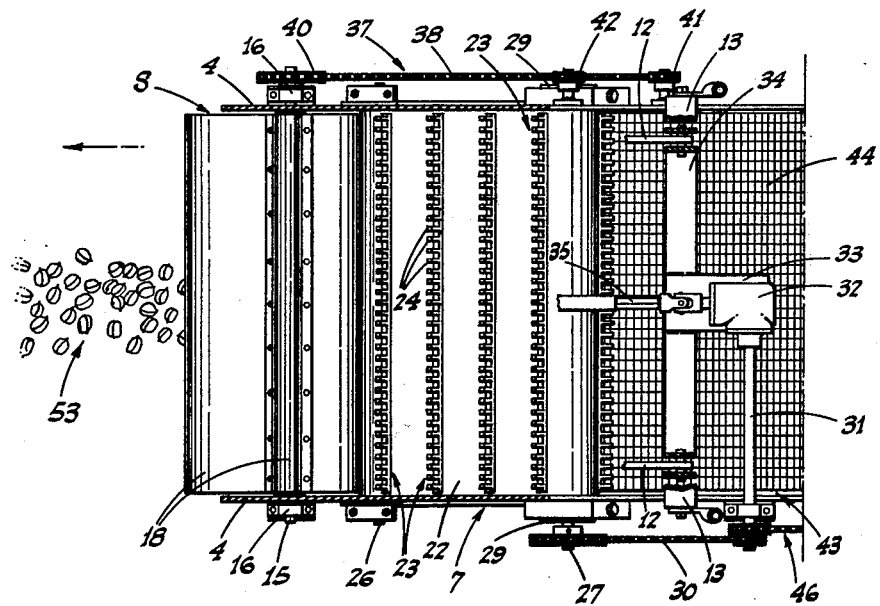
FIG. 3 is a sectional partial plan of the unit, taken on line 3—3 of FIG. 1.

In operation, the nuts 53 to be picked up are first collected and arranged on the ground in windrow form, as indicated in FIG. 3, by means of another machine. The tractor is then advanced in straddling relation to the windrow, so that the body 7 of the pick-up unit also straddles the same. With the sweep vanes 18 turning at the bottom in a direction opposite that of the advance of the body 7, each vane sweeps through the windrow of nuts and moves some of the same rearwardly and against a forwardly moving cleat 23 of the conveyor 19; the teeth 24 of each cleat being spaced so that relatively small sized foreign matter, but no nuts, can pass therebetween. The relative speeds of the vanes and conveyor cleats is such that as a vane 18 starts to move upwardly and rearwardly, a cleat also starts to move upwardly and forwardly; the vane and cleat then engaging each other. As a result, a cluster of the nuts is confined or pocketed between such vane and the conveyor belt ahead of said cleat, as indicated at 54 in FIG. 4. Such cluster, with the continued movement of the vane and cleat, is finally lifted onto the flat portion of the conveyor 19, where the nuts cannot fall from engagement by the cleat, as indicated at 55.

By reason of the fact that the conveyor belt 22 projects through the openings 25 in the side plates 4 instead of terminating between the plates, there are no narrow vertical cracks between said plates and the edges of the belt in which foreign matter, such as hull pieces, could become wedged and possibly interfere with the desired smooth movement of the conveyor.

The picked up clusters of nuts are successively discharged onto the foraminous cleaner conveyor 43 where any remaining foreign matter is separated from the nuts. The nuts are then discharged into the hopper 48 from which they are elevated and discharged into the wagon 50 for conveyance to the processing shed or elsewhere.

For pick up by the described unit each windrow of nuts, regardless of its height, is formed so that it is considerably narrower than the space between the side plates 4, and the width of the vanes 18 and conveyor belt 22. As a result, even though the windrow is scattered horizontally somewhat as the vanes engage the same, the scattered nuts are still retained within the confines of the side walls 4, and are all swept rearwardly and picked up by the combined vane and conveyor action.

The unit 1 is, of course, arranged so that it can be detached from the tractor when the use of the unit is no longer desired. This may be done by detaching the chains 10 from the brackets 11, disconnecting the arms 12 from the standards 13, and detaching the shaft 35 from the shaft 36. However, the connection and draft means between the body 7 and the tractor 3 is such that the body may be lifted from the ground when desired for transportation, without having to detach the body from the tractor.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A pick-up unit, for nuts or the like, comprising a body adapted for travel along the ground and including spaced side plates connected together in rigid relation, a driven conveyor mounted between the plates and including an endless belt having an upwardly and rearwardly sloping run moving in a rearward direction, and means functioning as the unit advances and included in part with the conveyor to gather nuts from the ground and deposit such nuts on the upper run of the conveyor; said means including a driven rotary sweep disposed between the plates ahead of the conveyor; the sweep including a plurality of radiating vanes each moving at the bottom position contra to the direction of advance of the unit and adapted to then engage nuts on the ground; the conveyor including a roller at its forward end about which the belt passes, and longitudinally spaced transversely extending nut engaging cleats on the belt, the cleats being deeper than the size of the nuts and passing substantially in ground engagement at the forward end of the conveyor; and means to drive the sweep and conveyor in coordinated relation so that each cleat and a vane will contact each other as they start to move upwardly whereby to confine a cluster of swept-up nuts between the vane and belt ahead of said cleat.

2. A pick-up unit, for nuts or the like, comprising a body adapted for travel along the ground and including spaced side plates connected together in rigid relation, a driven conveyor mounted between the plates and including an endless belt having an upwardly and rearwardly sloping run moving in a rearward direction, and means functioning as the unit advances and included in part with the conveyor to gather nuts from the ground and deposit such nuts on the upper run of the conveyor; the conveyor belt projecting through openings in the side plates; said openings following the longitudinal configuration of the belt in clearance relation thereto.

3. A pick-up unit, for nuts or the like, comprising a body adapted for travel along the ground and including spaced side plates connected together in rigid relation, means adapted to connect the body in draft relation to a tractor having a power take-off shaft, a conveyor mounted between the plates and including an endless belt having an upwardly and rearwardly sloping upper run adapted to move in a rearward direction, a rotary sweep mounted between the plates ahead of the conveyor, the sweep including flexible and resilient vanes projecting generally radially from the axis of the sweep for successive engagement with nuts on the ground as the sweep rotates, transverse cleats deeper than the size of the nuts projecting from the belt at intervals in its length, the cleats substantially engaging the ground when at the forward end of the conveyor, and drive means connecting the sweep and conveyor in coordinated relation so that the upper run of the belt and the lowermost vane of the sweep move rearwardly and so that each cleat and a vane will contact each other as they start to move upwardly whereby to confine a swept-up cluster of nuts between the vane and belt ahead of said cleat.

4. A unit, as in claim 3, in which the vanes have a radial extent sufficient to project to ground level when at their bottom position; the outer portion of each vane being curved in a direction contra to the movement thereof.

5. A pick-up unit, for nuts or the like, comprising a support adapted for travel along the ground, a driven endless conveyor mounted longitudinally on the support, the front end of the conveyor being closely adjacent the ground and the upper run of said conveyor moving rearwardly, transverse cleats on the conveyor in spaced relation, the cleats substantially engaging the ground at the front end of the lower run of said conveyor, a transverse axis rotary sweep mounted on the support immediately ahead of the front end of the conveyor, the sweep including a plurality of substantially radial flexible and resilient vanes, the sweep rotating in a direction such that each vane moves rearwardly at the bottom of said sweep, each vane being of a radial extent to substantially engage the ground at said bottom of the sweep, and means to drive the conveyor and sweep in coordinated relation so that each cleat and vane will contact each other as they start to move upwardly whereby to confine a swept-up cluster of nuts between the vane and conveyor ahead of said cleat.

6. A pick-up unit, for nuts or the like, comprising a body adapted for travel along the ground and including a conveyor having an endless belt with an upper run adapted to move in a rearward direction and projecting upwardly and rearwardly from adjacent ground level, and cross cleats projecting from the outer face of the belt at spaced intervals; a rotary sweep mounted ahead of the conveyor, the sweep including a plurality of spaced radiating vanes adapted to engage the ground as the sweep rotates, and means to drive the conveyor and sweep in opposite directions and in coordinated relation so that each cleat and a vane will contact each other as they start to move upwardly whereby to confine a cluster of swept-up nuts between the vane and belt ahead of said cleat.

References Cited by the Examiner
UNITED STATES PATENTS

| | | | |
|---|---|---|---|
| 2,561,754 | 7/51 | Propheter | 56—345 |
| 2,639,573 | 5/53 | McLaughlin | 56—328 |
| 2,901,879 | 9/59 | Jones | 56—328 |
| 2,993,322 | 7/61 | Wiebe | 56—328 |
| 3,021,661 | 2/62 | Couberly | 56—364 |
| 3,107,475 | 10/63 | Gustafson | 56—328 |

ABRAHAM G. STONE, *Primary Examiner.*

RUSSELL R. KINSEY, *Examiner.*